(12) United States Patent
Lee

(10) Patent No.: US 7,620,752 B1
(45) Date of Patent: Nov. 17, 2009

(54) CIRCUIT FOR AND METHOD OF PROCESSING DATA INPUT TO A FIRST-IN FIRST-OUT MEMORY

(75) Inventor: Hyun Soo Lee, Ithaca, NY (US)

(73) Assignee: Xilinx, Inc., San Jose, CA (US)

( * ) Notice: Subject to any disclaimer, the term of this patent is extended or adjusted under 35 U.S.C. 154(b) by 428 days.

(21) Appl. No.: 11/218,410

(22) Filed: Sep. 1, 2005

(51) Int. Cl.
*G06F 3/00* (2006.01)

(52) U.S. Cl. .......................................... 710/52; 710/55

(58) Field of Classification Search ..................... 710/52
See application file for complete search history.

(56) References Cited

U.S. PATENT DOCUMENTS

| | | | |
|---|---|---|---|
| 5,551,285 A * | 9/1996 | Gannon et al. ............... | 73/40.7 |
| 6,292,764 B1 * | 9/2001 | Avery et al. ................... | 703/14 |
| 6,944,172 B2 * | 9/2005 | Sankey et al. ................ | 370/412 |
| 7,254,677 B1 * | 8/2007 | Lowe et al. ................... | 711/118 |
| 2002/0013866 A1 * | 1/2002 | Noeldner et al. ............. | 710/22 |
| 2006/0187715 A1 * | 8/2006 | Narvaez et al. ........ | 365/185.24 |

* cited by examiner

*Primary Examiner*—Henry W. H. Tsai
*Assistant Examiner*—John B Roche
(74) *Attorney, Agent, or Firm*—John J. King

(57) ABSTRACT

A method of processing data input to a first-in first-out memory is disclosed. The method comprises steps of receiving input data words from a pipeline stage at an input of the first-in first-out memory; receiving data valid bits associated with the pipeline stage; generating a count associated with the data valid bits; and coupling the count to the first-in first-out memory. The step of generating a count associated with the data valid bits may comprise encoding the data valid bits to generate a valid data word representing the number of pipeline stages having valid data. The method of further comprises a step of generating an almost full signal based upon the count, and in particular generating an almost full signal when a read pointer incremented by the count of valid bits in the pipeline stages equals a write pointer. A circuit for processing data is also disclosed.

17 Claims, 7 Drawing Sheets

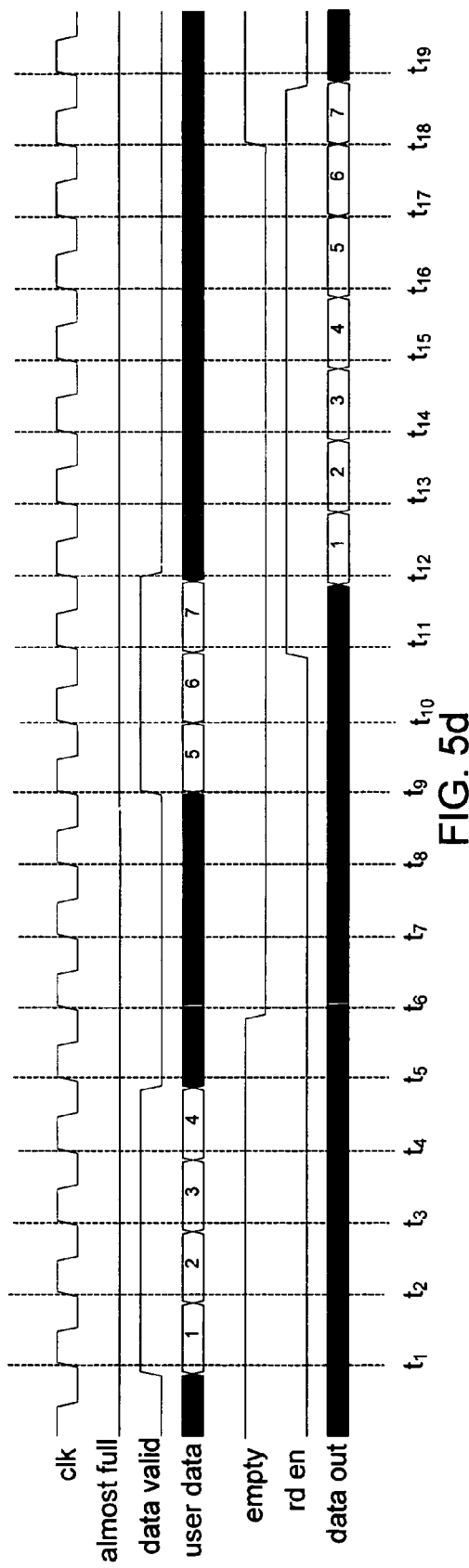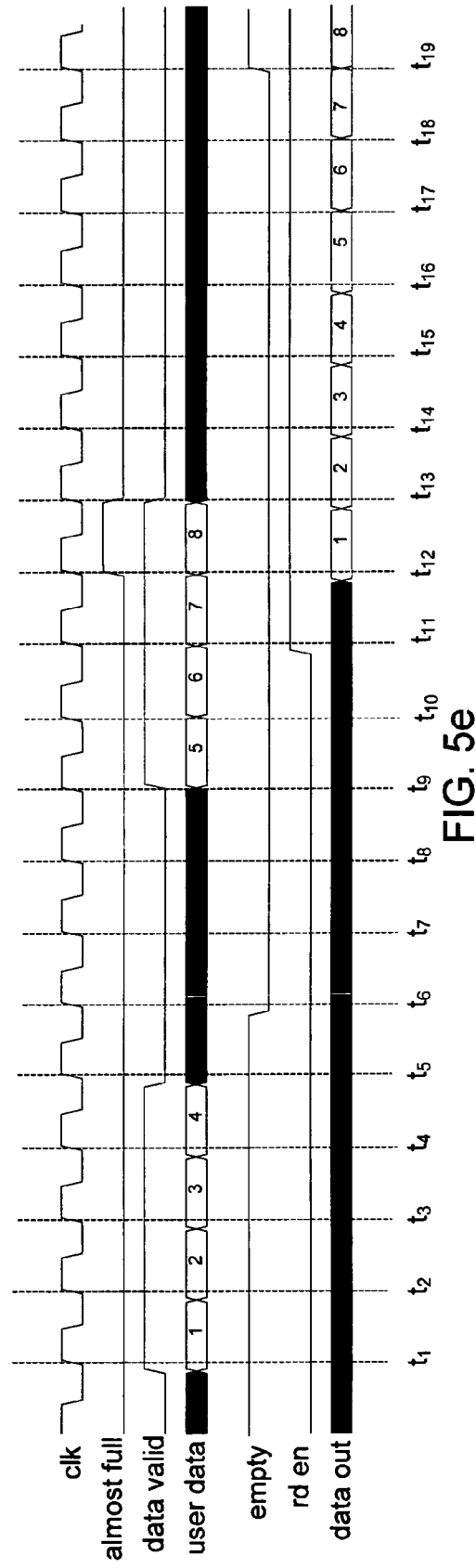
FIG. 5d
FIG. 5e

US 7,620,752 B1

CIRCUIT FOR AND METHOD OF PROCESSING DATA INPUT TO A FIRST-IN FIRST-OUT MEMORY

FIELD OF THE INVENTION

The present application relates generally to first-in first-out memories, and in particular, to a circuit for and a method of processing data input to a first-in first-out memory.

BACKGROUND OF THE INVENTION

Memory devices are important components of many integrated circuits or electronic devices having integrated circuits. In a synchronous memory, data may be written to and read from the memory using a single clock signal. In an asynchronous memory, data may be written to and read from the memory using two separate asynchronous clocks. The asynchronous clocks not only have a different phase, but also have a different frequency. Memory devices also have various protocols for outputting stored data. For example, a first-in first-out (FIFO) memory is a memory device where a data sequence can be written to and retrieved from the memory in exactly the same order. Because no explicit addressing is required, the write and read operations of a FIFO can be completely independent of each other and use unrelated clocks. One common implementation of a FIFO is a random access memory (RAM) having two independently clocked ports (i.e. one for writing and one for reading), and two independent address counters to steer write and read data.

Because memories are so significant to the operation of integrated circuits and electronic devices in general, it is important that data stored in a memory device can be correctly loaded and/or accessed. In particular, FIFOs commonly include signals indicating certain conditions of the FIFO, such as "Almost Full" or "Almost Empty," in order to avoid trying to load data in a FIFO which is full or read data from an empty FIFO. However, sometimes a strict specification of a system may limit options available to logic designers. One example of a system limit may be a maximum latency requirement. Although latency can be easily managed in a flow through design without any buffers, it becomes more complicated when a buffer, such as a FIFO, is introduced into the design. It may be particularly difficult to achieve the maximum throughput in a data path which contains both pipeline registers and a FIFO because of its latency requirement.

An example described in reference to FIG. 1 demonstrates the inefficiency which can result from a conventional design having pipeline registers and a FIFO limited by a latency requirement. In the circuit 100 of FIG. 1, a FIFO 102 is coupled to a pipeline stage 104 having a plurality of pipeline registers 106-112 for receiving user data in a data stream. Although the pipeline registers will be described as receiving data words of a data stream, by way of example, it should be understood that the data words could be single bit words, where the registers of the pipeline stage are single bit registers. A data valid stage 114 comprises a plurality of registers 116-122 for receiving data valid signals associated with the user data. The contents of the registers of the data valid stage indicate whether the data in a corresponding pipeline register is valid. That is, each register comprises a bit indicating whether the data in the corresponding pipeline register is valid. The output of the data valid stage 114 is coupled to a write enable port of the FIFO. Accordingly, when the data in the pipeline register 112 is valid (as indicated by a data bit "1" in the data valid register 122), data in the pipeline register is loaded into the FIFO on the next clock cycle.

In the conventional circuit shown in FIG. 1, the FIFO's Almost Full calculation always assumes the "worst case" scenario of a valid data word in each of the four pipeline registers. That is, because the loading of data from four pipeline registers into the FIFO cannot be stalled, the FIFO must always be able to accept four more data words after it asserts the Almost Full signal. In the example in this application where the FIFO has eight slots and four pipeline registers, the Almost Full signal is always asserted when words are present in four slots of the FIFO (regardless of the number of valid data words in the pipeline registers). Such a calculation is needed in the conventional circuit of FIG. 1 to ensure that data words in the pipeline registers will not cause the FIFO to overflow.

However, this calculation will prematurely trigger an Almost Full signal with only four words in the FIFO even when there are no valid data words in the pipeline registers, prompting the user to stop writing into the system, and therefore leading to inefficient operation of a system for processing data. This calculation adversely affects the system throughput, and particularly if the data transfer occurs in small bursts. As shown by way of example in FIG. 2, a burst of four data words (data words 1-4 loaded into the pipeline registers between times $t_1$ and $t_5$) will travel through the pipeline registers and be stored in the FIFO between times $t_5$ and $t_9$. After a time $t_5$, when the first data word from the pipeline stage is loaded into the FIFO, the empty signal goes low. As can be seen, at time $t_9$ when all four data words from the pipeline stage are read into the FIFO (which was previously empty), the Almost Full signal goes high, indicating that no new data should be read into the pipeline stage. That is, the FIFO will overflow if all of the pipeline registers have data and an additional data word is loaded into the pipeline stage when a word is written into the FIFO (already having words in four of the eight slots without reading one of the words from the FIFO). The Almost Full signal will remain asserted until a word is read out through the output interface of the FIFO.

When the read enable signal is high at time $t_{11}$, data words are readout through the output interface. When there are less than four data words remaining in the FIFO as the data words are read out of the output interface, Almost Full signal will de-assert at time $t_{12}$, indicating to the user of write interface to resume writing. However, before the very first data word of a second burst of data words (data words 5-8) can reach the FIFO from the pipeline registers, the empty flag is asserted because the FIFO has been emptied out by a user of the read interface. The empty signal will then trigger the read interface user to stop reading from the system. As can be seen, the empty flag is asserted between times $t_{15}$ and $t_{17}$, causing the read enable to go low between times $t_{16}$ and $t_{18}$. As a result, the output of data is delayed between times $t_{16}$ and $t_{19}$. Accordingly, the total throughput of the system is reduced because every Almost Full signal assertion is followed by an empty flag assertion causing the user of the read interface to stall its reading from the FIFO.

Accordingly, there is a need for a circuit and method of processing data input to FIFO having a pipeline stage to increase the throughput of the FIFO.

SUMMARY OF THE INVENTION

A method of processing data input to a first-in first-out memory is disclosed. The method comprises steps of receiving input data words from a pipeline stage at an input of the first-in first-out memory; receiving data valid bits associated with the pipeline stage; generating a count associated with the data valid bits; and coupling the count to the first-in first-out memory. The step of generating a count associated with the data valid bits may comprise encoding the data valid bits to generate a valid data word representing the number of pipeline registers having valid data. The method further comprises a step of generating an Almost Full signal based upon the count, and in particular generating an Almost Full signal when a read pointer incremented by the count of valid bits in the pipeline registers equals a write pointer.

A method of processing data input to a first-in first-out memory according to an alternate embodiment comprises steps of receiving data words of an input data stream in a plurality of pipeline registers of a pipeline stage at an input of the first-in first-out memory; receiving a value indicating the number of registers of the pipeline stage having valid data; and generating an Almost Full signal when the number of occupied slots in the first-in first-out memory incremented by the value indicating the number of pipeline registers of the pipeline stage having valid data equals a total number of available slots in the first-in first-out memory. The value indicating the number of pipeline registers having valid data could be based upon receiving a bit for each pipeline register of the pipeline stage indicating whether the data in each pipeline register is valid. The method preferably comprises a step of generating an Almost Full signal based upon count of the bits used to indicate whether the data in each pipeline registers is valid.

A circuit for generating a stream of data is also disclosed. The circuit comprises a first-in first-out memory; a plurality of pipeline registers of a pipeline stage coupled to an input of the first-in first-out memory; a plurality of data valid registers associated with the plurality of pipeline registers; and a counter coupled to the plurality of data valid registers. The plurality of data valid registers is preferably coupled to a write enable input of the first-in first-out memory. The counter may comprise encoder receiving an input from each data valid register and generating an output based upon the number of data valid registers indicating that valid data is in a corresponding pipeline register. Finally, an Almost Full signal may be generated based upon a value of the counter and values of write and read pointers.

DETAILED DESCRIPTION OF THE DRAWINGS

Figure 1:
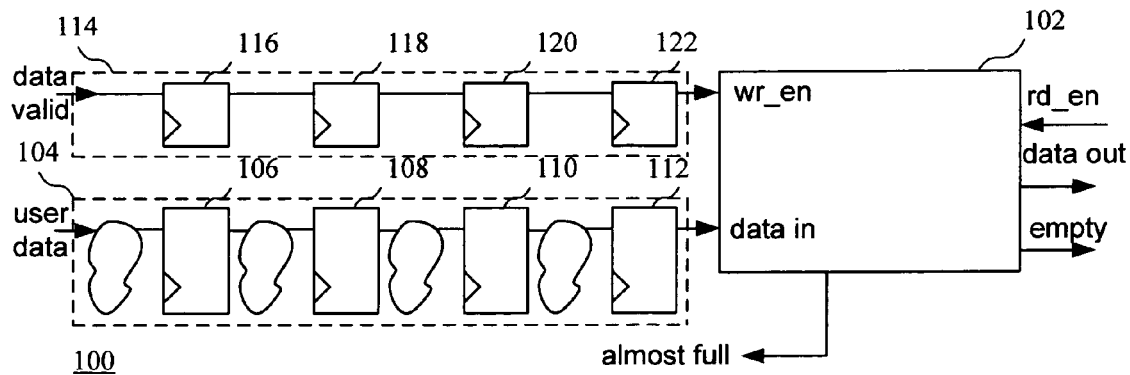
FIG. 1 is a block diagram of a conventional FIFO circuit having a pipeline register.
Figure 3:
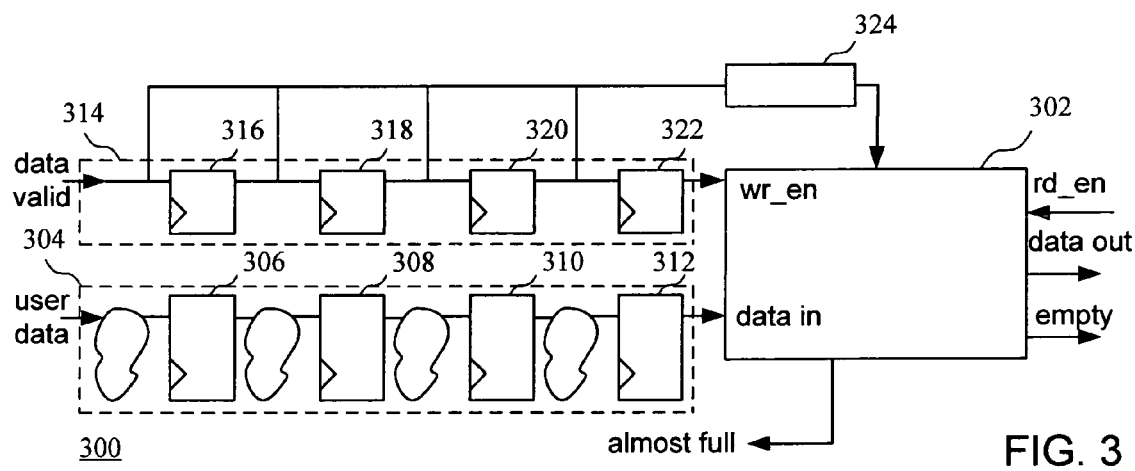
FIG. 3 is block diagram of a FIFO circuit having a pipeline stage according to an embodiment of the present invention.
Figure 2:
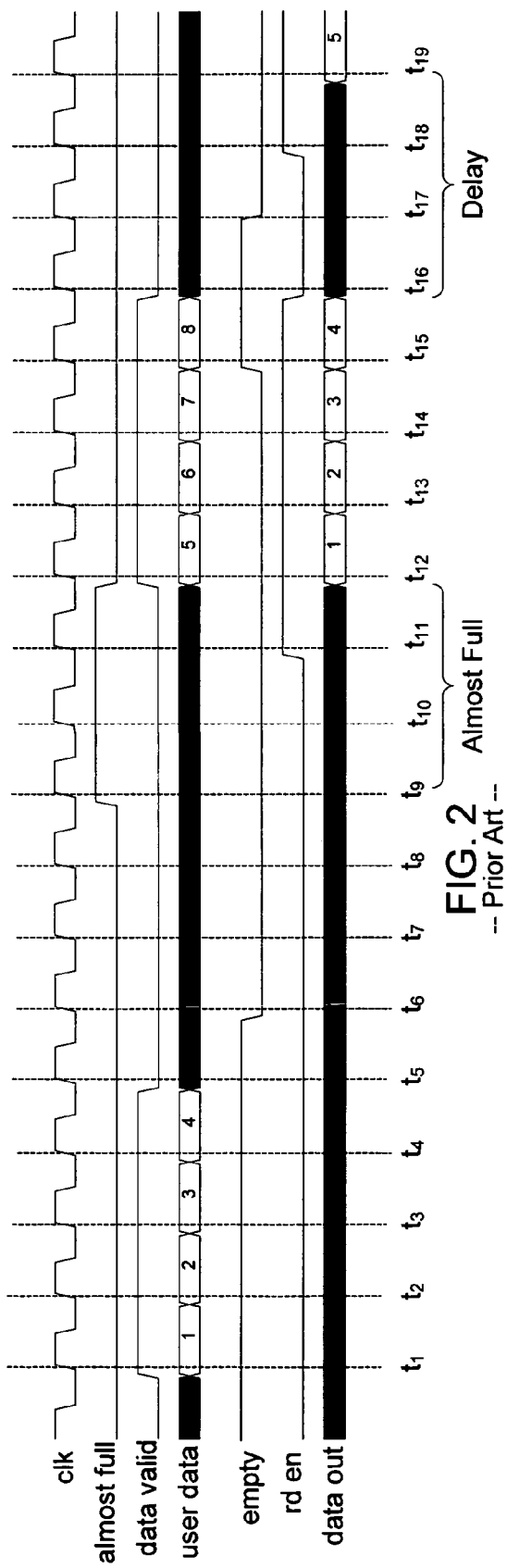
FIG. 2 is a timing diagram showing the operation of the circuit of FIG. 1.

Turning first to FIG. 3, block diagram of a FIFO circuit having a pipeline stage according to an embodiment of the present invention is shown. In particular, the circuit 300 of FIG. 3 comprises a FIFO 302 coupled to a pipeline stage 304 having a plurality of pipeline registers 306-312 for receiving user data words in a data stream. The data stream may comprise words of data, where the words may comprise any number of bits including a single bit. Generally, the words of data will comprise an equal number of bits. A data valid stage 314 comprises a plurality of registers 316-322 for receiving data valid signals associated with the data words of the data stream (i.e. associated with the corresponding registers of the pipeline stage 304). The output of the data valid stage 314 is coupled to a write enable port of the FIFO. The input to each register of the data valid stage 314 is also coupled to a counter 324 for generating a count of the number of valid words in the pipeline stage 304 at a given time. According to one embodiment, the counter 324 may comprise an encoder for receiving each of the bits input to each of the registers of the valid data stage, and generating an encoded output comprising a valid data word representing the number of registers of the pipeline stage 304 having valid data. For example, if the bit in each of the registers 318 and 320 indicates that there is valid data in corresponding pipeline registers 308 and 310, the counter 324 would generate a valid data word indicating that there is valid data in two of the registers. If an encoder is used, two of the four inputs to counter 324 would be high, the counter would generate a two at the output, such as a binary "01", which would be coupled to the FIFO. This count may then be used by the FIFO to determine when to generate an Almost Full signal. For example, in contrast to a conventional device which would generate an Almost Full signal whenever the number of remaining empty slots of the FIFO equals the number of registers of the pipeline stage, the circuit of the present application would only generate an Almost Full signal when the number of registers of the pipeline stage having valid data equals the number of remaining empty slots of the FIFO at a given clock cycle.

Figure 4:
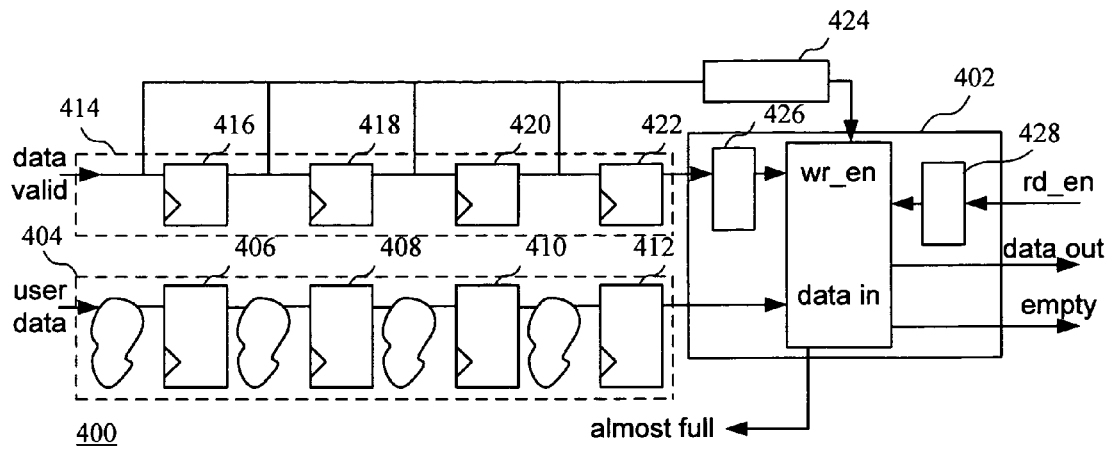
FIG. 4 is a block diagram of a FIFO circuit having a pipeline stage according to an alternate embodiment of the present invention.

Turning now to FIG. 4, a block diagram of a FIFO circuit having a pipeline stage according to an alternate embodiment of the present invention is shown. In particular, the circuit 400 of FIG. 4 comprises a FIFO 402 coupled to a pipeline stage 404 having a plurality of pipeline registers 406-412 for receiving user data words in a data stream. A data valid stage 414 comprises a plurality of registers for receiving data valid signals associated with the user data. The input to each register of the data valid stage 414 is coupled to a counter 424 for generating a count of the number of data valid signals in the data valid stage 414. According to the embodiment of FIG. 4, a write counter 426 is coupled to the output of the data valid stage 414 to generate a write pointer value for the FIFO, and a read counter 428 is coupled to receive the read enable signal to generate a read pointer value for the FIFO. An Almost Full signal is generated when a read pointer for the FIFO incremented by the count generated by a counter 424 equals a write pointer for the FIFO.

Figure 5A:
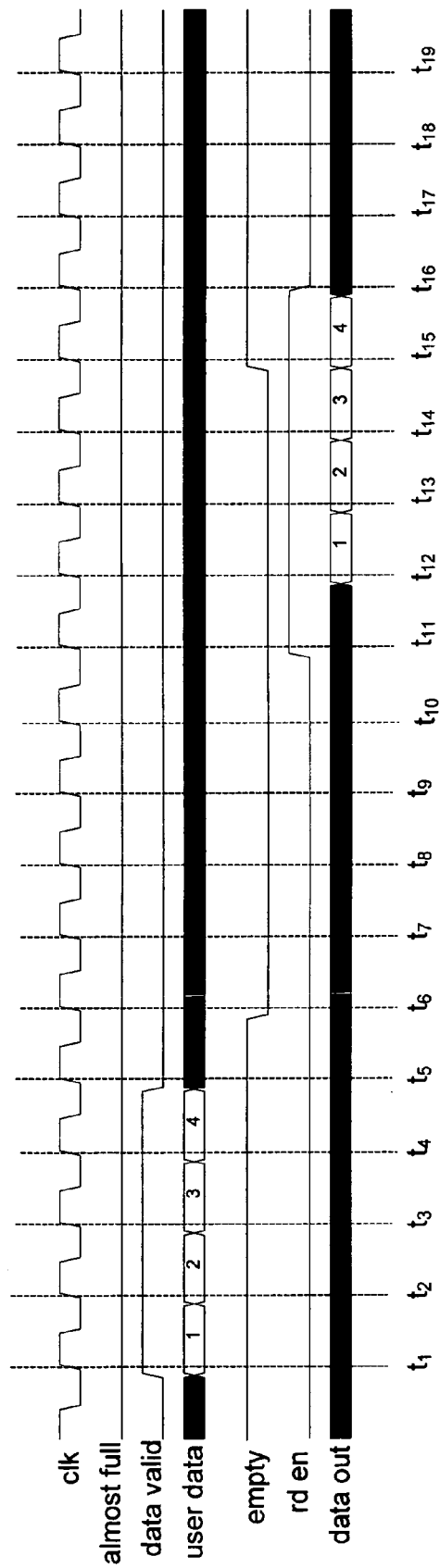
FIG. 5 is a timing diagram showing the operation of the circuits of FIGS. 3 and 4.
Figure 5B:
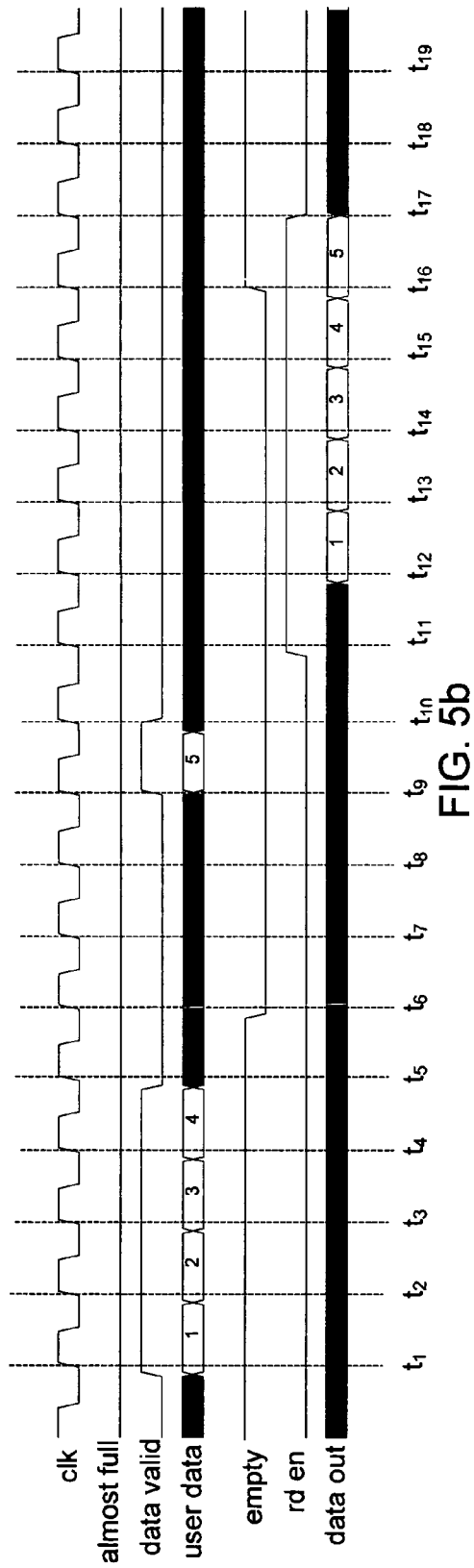
Figure 5C:
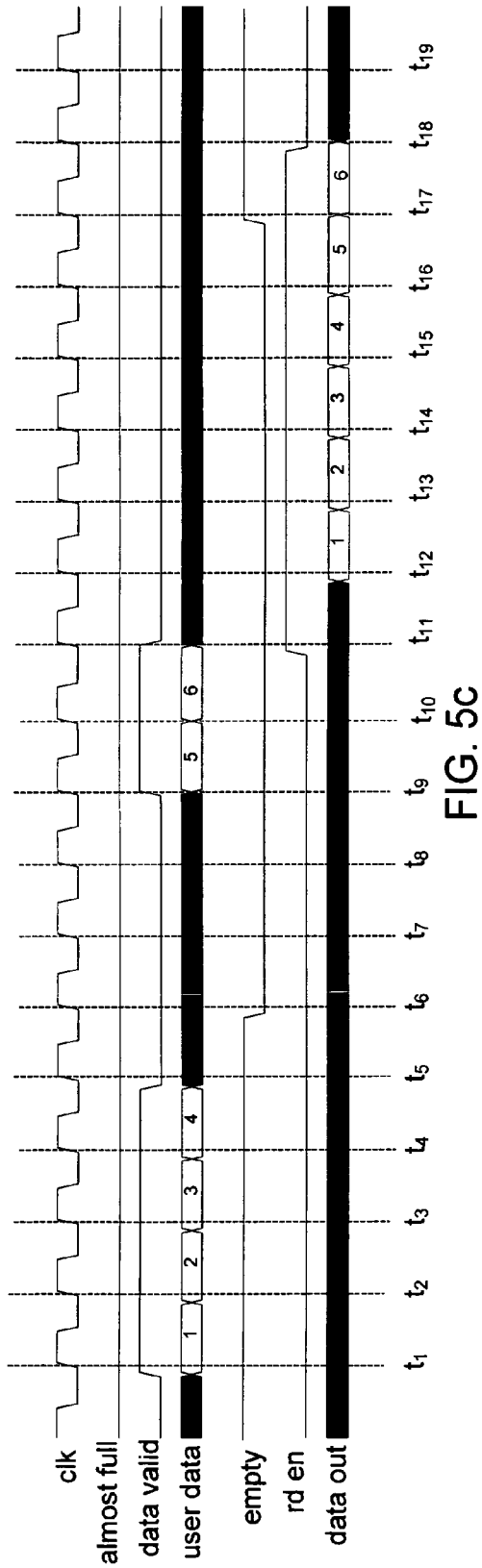

Turning now to FIG. 5, a series of timing diagrams show how the operation of the circuits of FIGS. 3 and 4 prevent any delay in the output of data if four slots of the FIFO are filled. FIG. 5a shows an initial case of an eight slot FIFO (coupled to a pipeline stage having four pipeline registers) where four slots of the FIFO are full. As can be seen, all four words are read out without any delay after a high read enable signal is received, as in a conventional circuit. As shown in FIG. 5b, after four words are read into the pipe stages, a fifth word is read in at time $t_9$. However, as can be seen, all five words are read out in succession without any delay between times $t_{12}$ and $t_{17}$. That is, unlike a conventional circuit where an Almost Full signal was generated at time $t_9$, the Almost Full signal remains low because only a single data word (data word 5) has been read into the pipeline stage when there are already four words in the FIFO. Similarly, as shown in FIGS. 5c and 5d, six and seven words are read out successively without any delay because only two or three data words respectively have been read in. Finally, as shown in FIG. 5e, after four words have been loaded into the pipeline stage (when there are already four words in the FIFO), an Almost Full signal is generated at time $t_{12}$. However, as shown, all eight words are read out without any delay (although no new words will be loaded into a pipeline register until at least one word has been read out).

Accordingly, the circuits of FIGS. 3 and 4 provide a way to maximize the utilization of a shallow FIFO in a latency-sensitive system by encoding the valid bits of the valid data registers and passing the encoded information into the FIFO. In order to employ the four data slots in the FIFO that can potentially be wasted, the number of valid words in the pipe stages are used in the Almost Full flag calculation. By dynamically encoding and passing the number of valid words available in the pipeline stage into the FIFO, the entire data path can mimic the behavior of an eight-deep FIFO on each clock cycle, allowing the user to maximize throughput. The circuits can be scaled to work with different depth pipe stages by scaling the encoding module accordingly. The minimum size of the encoding module is calculated where the encoded output width equals log 2 (number of pipeline registers) plus one.

Figure 6:
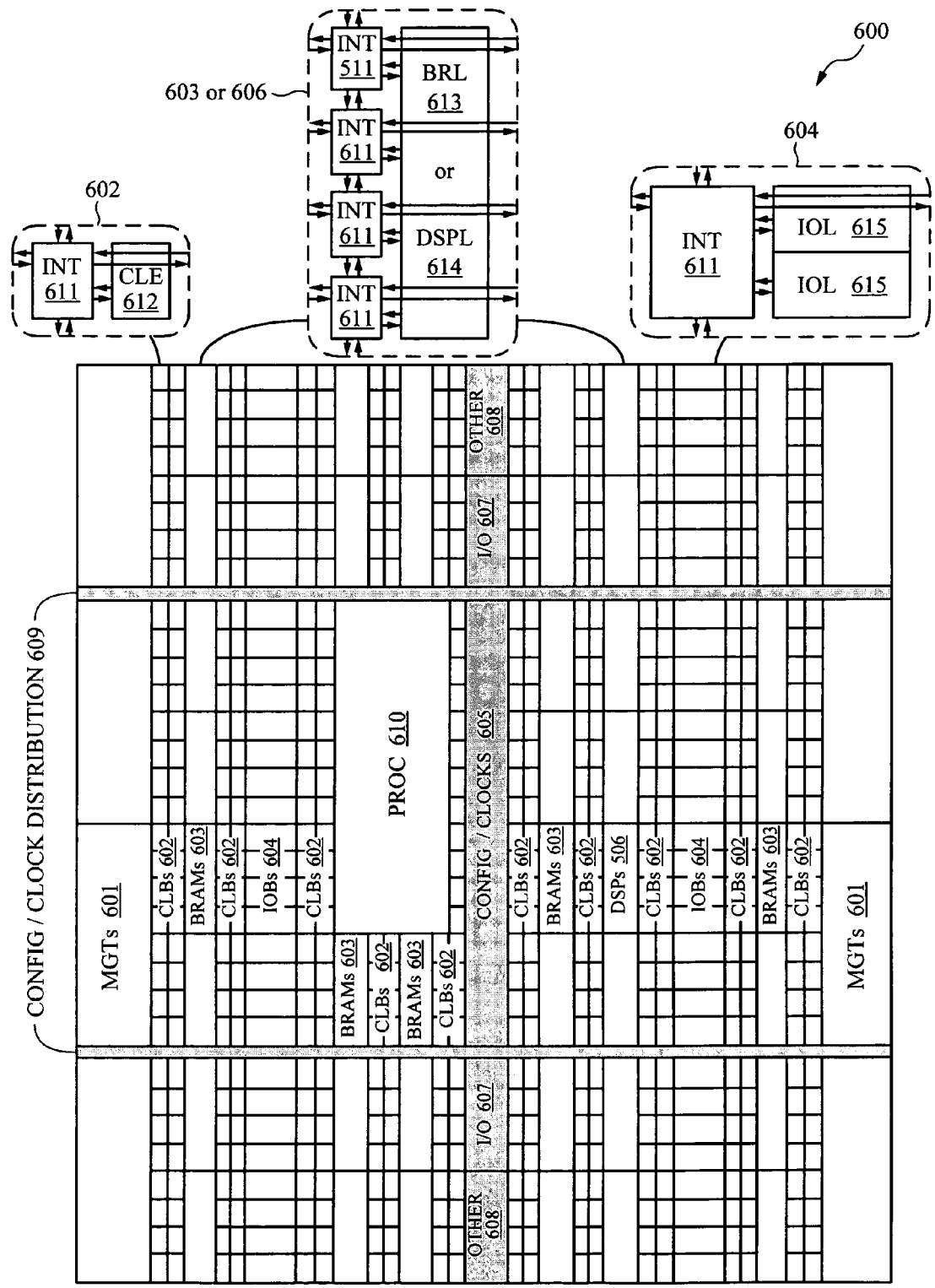
FIG. 6 is a block diagram of a programmable logic device according to an embodiment of the present invention.

Turning now to FIG. 6, a block diagram of a programmable logic device according to an embodiment of the present invention is shown. In particular, the FIFO circuits of FIGS. 3 and 4 could be employed in a programmable logic device, such as the programmable logic device of FIG. 6. Advanced FPGAs can include several different types of programmable logic blocks in the array. For example, FIG. 6 illustrates an FPGA architecture 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. Some FPGAs also include dedicated processor blocks (PROC 610). In addition some FPGAs such as the Virtex™-4 FPGA from Xilinx Inc. of San Jose, Calif., have hardwire asynchronous FIFOs associated with at least some of the BRAMs 603.

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 112) that can be programmed to implement user logic plus a single programmable interconnect element (INT 611). The circuit elements of the circuit of FIGS. 3 and 4 could be implemented in one or more CLBs, for example. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 109 extending from this column are used to distribute the clocks and configuration signals across the breadth of the FPGA. Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic. Similarly the circuits and methods of the present invention could be implemented in any device, including any type of programmable logic device, having memory.

Figure 7:
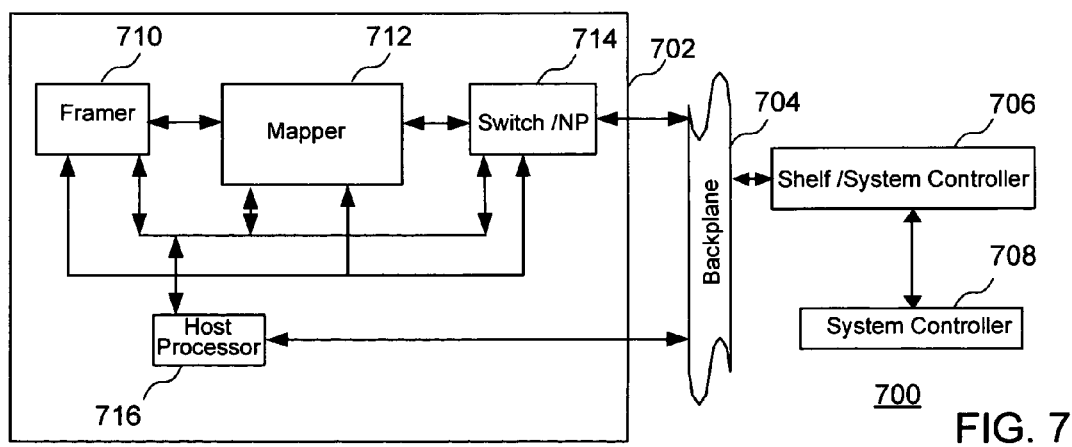
FIG. 7 is a block diagram of a circuit employing a FIFO according to an embodiment of the present invention.

Turning now to FIG. 7, a block diagram of a circuit 700 employing a FIFO according to an embodiment of the present invention is shown. The circuit 700 could be, for example, a generic Packet over Sonet (PoS)/SDH line card typically found in a multi-service provisioning platform. As can be seen in FIG. 7, a circuit 702 may comprise a programmable logic device, such as the programmable logic device of FIG. 6 employing a FIFO according to an embodiment of FIG. 3 or 4, for example. According to the embodiment of FIG. 7, the programmable logic device 702 may be coupled to a backplane 704 for routing data to a Shelf/System Controller 706 and a System Controller 708. The circuit 702 comprises a framer 710, a mapper 712, and a switch/node point 714 coupled to the backplane 704 to generate data according to an embodiment of FIG. 3 or 4. An optional host processor could be employed to control the elements of the circuit 702.

Figure 8:
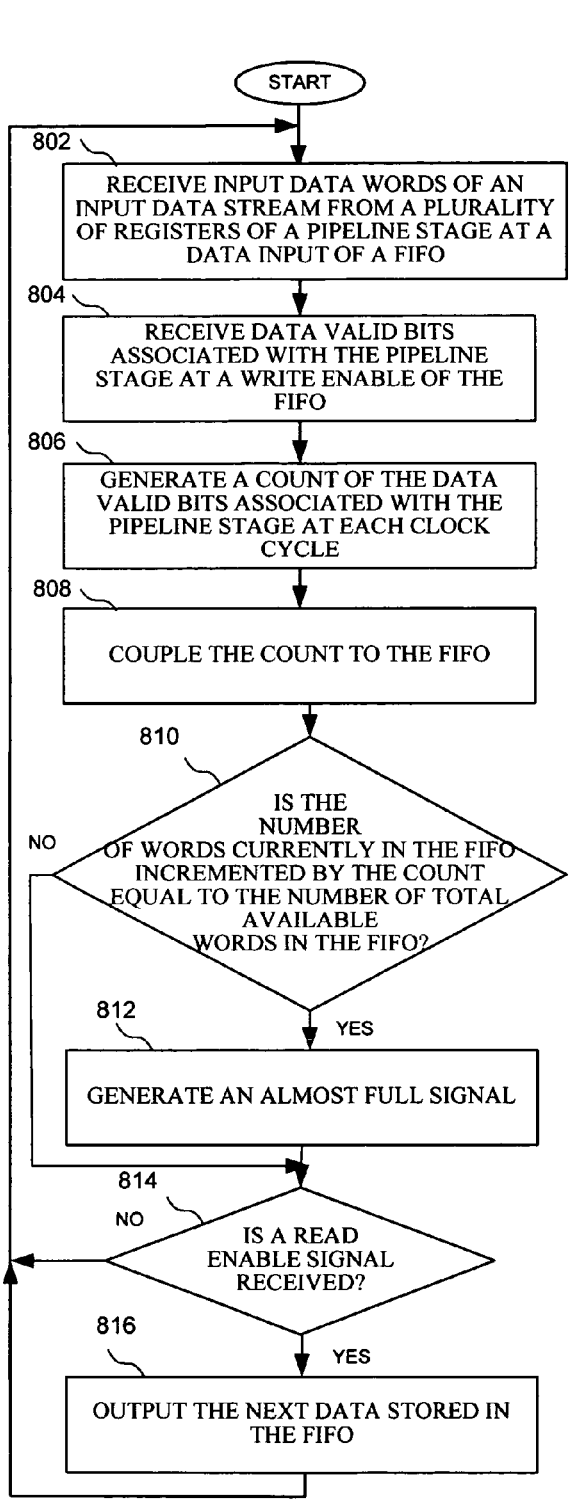
FIG. 8 is a flow chart showing a method of processing data input to a FIFO according to an embodiment of the present invention.

Turning now to FIG. 8, a flow chart shows a method of processing data input to a FIFO according to an embodiment of the present invention. The method of FIG. 8, as well as the following method described in reference to FIG. 9, could be employed using any of the circuits of FIGS. 3-7. Input data words of an input data stream are received from a plurality of pipeline registers at a data input of a FIFO at a step 802. Data valid bits associated with the pipeline registers are received at a write enable of the FIFO at a step 804. A count of the data valid bits associated with the pipeline stage is generated at each clock cycle at a step 806. The count is coupled to the FIFO at a step 808. It is then determined when the number of words currently in the FIFO incremented by the count is equal to the number of total available words in the FIFO at a step 810. If so, an Almost Full signal is generated at a step 812. It is then determined whether a read enable signal is received at a step 814. If so, the next data stored in the FIFO is output at a step 816.

Figure 9:
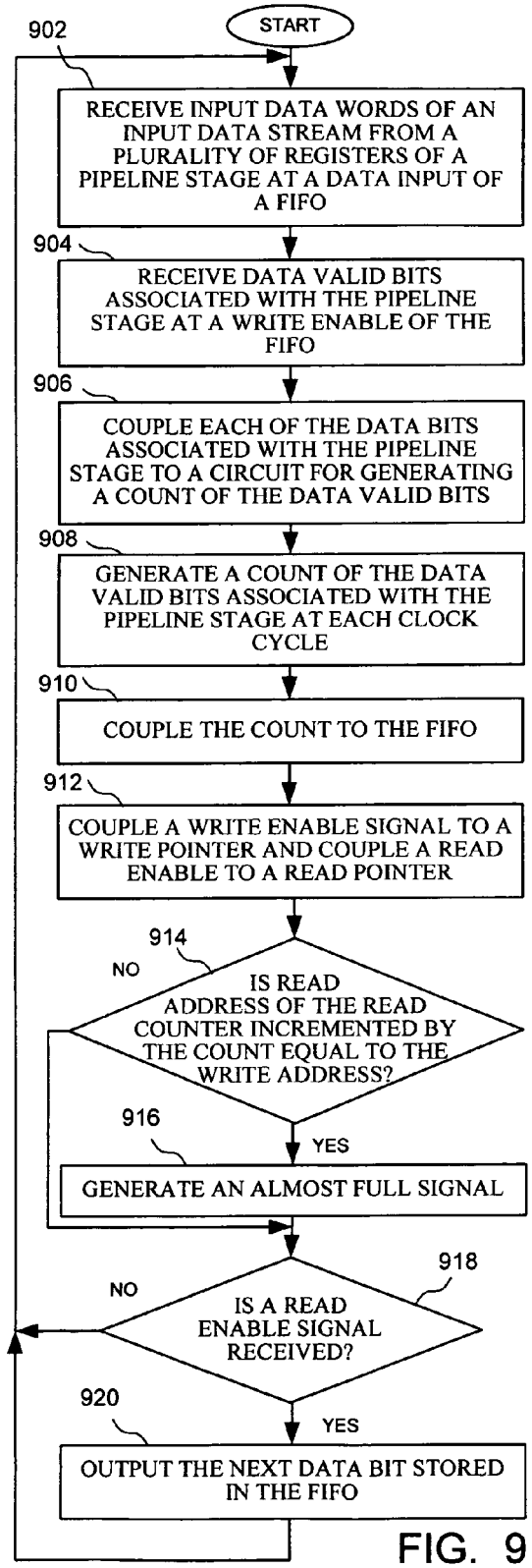
FIG. 9 is a flow chart showing a method of processing data input to a FIFO according to an alternate embodiment the present invention.

Turning now to FIG. 9, a flow chart shows a method of processing data input to a FIFO according to an alternate embodiment the present invention. Input data words of an input data stream are received from a plurality of pipeline registers at a data input of a FIFO at a step 902. Data valid bits associated with the pipeline stage are received at a write enable of the FIFO at a step 904. Each of the data bits associated with the pipeline stage are coupled to a circuit for generating a count of the data valid bits at a step 906. A count of the data valid bits associated with the pipeline stage are generated at each clock cycle at a step 908. The count is coupled to the FIFO at a step 910. A write enable signal is coupled to a write pointer and a read enable is coupled to a read pointer at a step 912. It is then determined whether a read address of the read counter incremented by the count is equal to the write address at a step 914. If so, an Almost Full signal is then generated at a step 916. It is then determined whether a read enable signal is received at a step 918. If so, the next data bit stored in the FIFO are output at a step 920.

It can therefore be appreciated that the new and novel circuit and method of processing data input to a FIFO has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A method of processing data input to a first-in first-out memory, said method comprising the steps of:
   receiving input data words from a pipeline stage comprising a plurality of pipeline registers coupled in series at an input of said first-in first-out memory;
   receiving data valid bits comprising a data valid bit for each pipeline register of said plurality of pipeline registers of said pipeline stage;
   generating a count associated with said data valid bits indicating a number of a plurality of pipeline registers of said pipeline stage having valid data;
   coupling said count to said first-in first-out memory; and
   generating an Almost Full signal based upon said count and a number of occupied slots of said first-in first-out memory.

2. The method of claim 1 wherein said step of generating a count associated with said data valid bits comprises a step of encoding said data valid bits to generate a valid data word representing the number of valid words occupying said pipeline stages.

3. The method of claim 2 further comprising a step of generating said Almost Full signal based upon said valid data word.

4. The method of claim 1 wherein said step of generating an Almost Full signal comprises a step of generating an Almost Full signal when a read pointer incremented by said count equals a write pointer.

5. A method of processing data input to a first-in-first-out memory, said method comprising the steps of:
   receiving data words of an input data stream in a plurality of pipeline registers of a pipeline stage at an input of said first-in first-out memory, wherein said plurality of pipeline registers are coupled in series;
   receiving a value indicating the number of pipeline registers of said pipeline stage having valid data; and
   generating an Almost Full signal based upon said value and a number of occupied slots of said first-in first-out memory, where said Almost Full signal is generated when the number of occupied slots in said first-in first-out memory incremented by said value indicating the number of pipeline registers of said pipeline stage having valid data equals a total number of available slots in said first-in first-out memory.

6. The method of claim 5 further comprising a step of receiving data valid bits comprising a bit for each pipeline register of said pipeline stage to indicate whether the data in each pipeline register is valid.

7. The method of claim 6 wherein said step of receiving a value indicating the number of pipeline registers having valid data comprises a step of receiving an encoded value comprising a number representing the number of pipeline registers having valid data based upon said data valid bits.

8. The method of claim 6 further comprising a step of coupling said data valid bits to a write enable input of said first-in first-out memory with said data bits from said corresponding plurality of pipeline registers input to a data input of said first-in first-out memory.

9. The method of claim 6 wherein said step of generating an Almost Full signal comprises a step of generating an Almost Full signal based upon an encoded value of said data valid bits.

10. The method of claim 6 further comprising a step of receiving a read enable signal at said first-in first-out memory, wherein a write pointer is incremented by said data valid bits and a read pointer is incremented by said read enable signal.

11. The method of claim 10 wherein said step of generating an Almost Full signal comprises a step of generating an Almost Full signal when a read pointer incremented by said value indicating the number of pipeline registers having valid data equals a write pointer.

12. A circuit for generating a stream of data, said circuit comprising:
   a first-in first-out memory;
   a plurality of pipeline registers of a pipeline stage coupled to an input of said first-in first-out memory, wherein said plurality of pipeline registers are coupled in series;
   a plurality of data valid registers associated with said plurality of pipeline registers; and
   a counter coupled to said plurality of data valid registers and said first-in first-out memory, wherein said first-in first-out memory generates an Almost Full signal based upon a count from said counter indicating a number of pipeline registers of said pipeline stage having valid data and a number of occupied slots of said first-in first-out memory.

13. The circuit of claim 12 wherein said plurality of data valid registers is coupled to a write enable input of said first-in first-out memory.

14. The circuit of claim 13 wherein said counter comprises an encoder receiving an input from each data valid register and generating an output based upon the number of data valid bits indicating that valid data is in a corresponding pipeline register.

15. The circuit of claim 13 further comprising a write pointer coupled to receive the output of said plurality of data valid registers and a read pointer coupled to receive a read enable signal.

16. The circuit of claim 15 wherein said Almost Full signal is output by said first-in first-out memory when said read pointer incremented by a count generated by said counter equals said write pointer.

17. The circuit of claim 12 wherein said circuit is part of a programmable logic device in a Packet over Sonet (PoS)/SDH system.

\* \* \* \* \*

UNITED STATES PATENT AND TRADEMARK OFFICE
CERTIFICATE OF CORRECTION

PATENT NO.         : 7,620,752 B1                                    Page 1 of 1
APPLICATION NO.  : 11/218410
DATED              : November 17, 2009
INVENTOR(S)        : Hyun Soo Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twenty-sixth Day of October, 2010

David J. Kappos
*Director of the United States Patent and Trademark Office*